(12) United States Patent
Altmann et al.

(10) Patent No.: US 9,115,771 B2
(45) Date of Patent: Aug. 25, 2015

(54) FLANGED FREEWHEEL

(75) Inventors: Frieder Altmann, Pommersfelden (DE); Swen Doerrie, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/351,767

(22) PCT Filed: Jul. 3, 2012

(86) PCT No.: PCT/EP2012/062871
§ 371 (c)(1),
(2), (4) Date: Apr. 14, 2014

(87) PCT Pub. No.: WO2013/053505
PCT Pub. Date: Apr. 18, 2013

(65) Prior Publication Data
US 2014/0231206 A1 Aug. 21, 2014

(30) Foreign Application Priority Data
Oct. 13, 2011 (DE) .......................... 10 2011 084 402

(51) Int. Cl.
*F16D 41/00* (2006.01)
*F16D 41/066* (2006.01)
*F16D 41/07* (2006.01)

(52) U.S. Cl.
CPC .............. *F16D 41/00* (2013.01); *F16D 41/066* (2013.01); *F16D 41/07* (2013.01)

(58) Field of Classification Search
CPC ..... F16D 41/067; F16D 41/066; F16D 41/07; F16D 41/00
USPC ........................... 192/45.004, 45.006, 45.008
See application file for complete search history.

(56) References Cited

U.S. PATENT DOCUMENTS

| | | | | |
|---|---|---|---|---|
| 3,528,534 A | * | 9/1970 | Benson et al. | 192/45.006 |
| 2001/0011623 A1 | * | 8/2001 | Ogata et al. | 192/45 |
| 2006/0137958 A1 | | 6/2006 | Bogdanovic | |
| 2010/0000480 A1 | * | 1/2010 | Weber | 123/90.17 |
| 2010/0147241 A1 | * | 6/2010 | Damian et al. | 123/179.25 |
| 2011/0168119 A1 | | 7/2011 | Steele | |

FOREIGN PATENT DOCUMENTS

| | | |
|---|---|---|
| DE | 101 48 386 | 4/2003 |
| DE | 10 2008 021 960 | 11/2009 |
| EP | 0 753 682 | 1/1997 |

* cited by examiner

*Primary Examiner* — Huan Le
(74) *Attorney, Agent, or Firm* — Davidson, Davidson & Kappel, LLC

(57) ABSTRACT

A flanged freewheel (1) with an outer ring (2) which is configured as an angled flange part and which has an axially oriented ring flange (5) that forms a running surface (7) for clamping elements and a radially oriented flange area (3) for attaching the flanged freewheel (1). In order to retain or improve the strength of the outer ring (2)—despite a reduced wall thickness (x)—a ring collar (13) that faces radially inwards is provided at the free end face (12) of the ring flange (5).

13 Claims, 1 Drawing Sheet

FLANGED FREEWHEEL

The invention relates to a flanged freewheel with an outer ring which is configured as an angled flange part and which has an axially oriented ring flange that forms a running surface for clamping elements and a radially oriented flange area for attaching the flanged freewheel.

BACKGROUND

German patent application DE 2008 021 960 A1 discloses a flanged freewheel which has an outer ring and which, as an angled flange, has a ring flange that forms a running surface for clamping elements such as clamping rollers, and a flange part for attachment to a housing or housing part. The outer ring is made of sheet metal by means of a deep-drawing process. The required strength of the outer ring for use, for example, in starter freewheels for starting internal combustion engines in motor vehicles, calls for a sheet metal thickness of at least 5 mm. As a result, the production is limited because of the cycle times of the production equipment that can process sheet metal of such a thickness. Moreover, experiments have shown that, if the requirements become more stringent—especially due to an increase in the transmission torque in the area of the free end face of the ring flange—surface cracks, higher notch factors and elevated tangential stress can all occur.

SUMMARY OF THE INVENTION

It is an object of the present invention to provide a flanged freewheel that—despite the fact that the sheet metal for the outer ring is thinner—can at least match the strength requirements of an outer ring made of thicker sheet metal, while also being cheaper to produce.

The present invention provides a flanged freewheel with an outer ring which is configured as an angled flange part and which has an axially oriented ring flange that forms a running surface for clamping elements, and a radially oriented flange area for attaching the flanged freewheel, whereby a ring collar that faces radially inwards is provided at the free end face of the ring flange. The installation of the additional ring collar at the open flange end of the ring flange makes it possible to reduce the wall thickness to less than 5 mm, preferably to about 3.5 mm, while retaining or improving the strength of the outer ring, as a result of which material costs can be saved and simpler production equipment with high cycle times can be employed. Here, the ring collar reinforces the radial support of the self-supporting ring flange in its end area. It goes without saying that the wall thickness can also be reduced by about 30% in the case of other wall thicknesses that are normally employed in serial production.

In order to easily form the running surface on the outer ring, the actual running surface for the clamping elements can be provided on an insert part that is placed into the ring flange and non-rotatably joined to it. Preferably, however, the running surface is created off-tool on the ring flange of the outer ring.

The running surface is configured as a function of whether the flanged freewheel is designed as a clamping roller freewheel or as a clamping element freewheel with out-of-round rollers. For example, in the case of a clamping roller freewheel, an inner race having clamping ramps arranged along the circumference can be provided on the inner ring, so that the running surface of the ring flange has a cylindrical configuration. Preference, however, is given to creating a flanged freewheel which is configured as a clamping roller freewheel and in which the clamping elements are clamping rollers that roll off of clamping ramps of the outer ring. Here, the clamping ramps are preferably formed off-tool.

In an alternative embodiment of the flanged freewheel as a clamping element freewheel, the clamping elements are provided on cylindrical running surfaces of the outer ring and of an inner ring as out-of-round clamping elements whose diameter expands as they turn around their axes of rotation.

BRIEF DESCRIPTION OF THE DRAWINGS

The invention will be described in greater detail below on the basis of the embodiment depicted in FIGS. 1 to 3. The following is shown.

DETAILED DESCRIPTION

Figure 1:
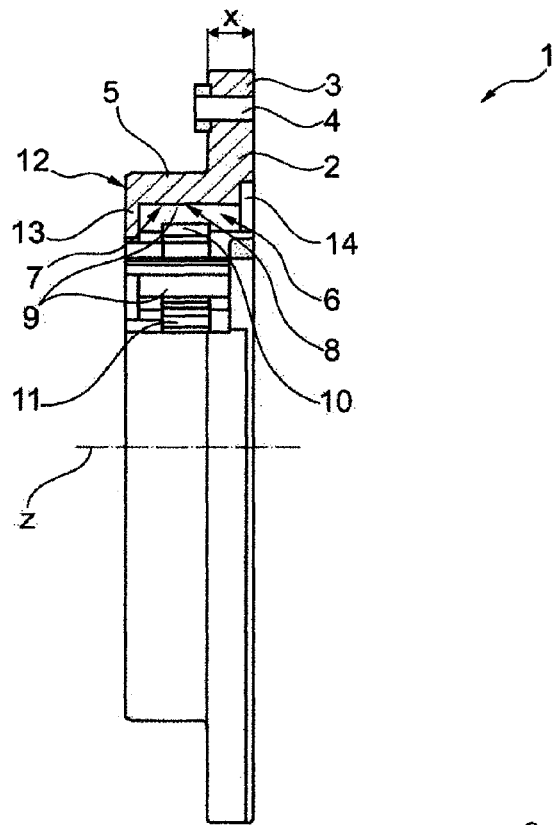
FIG. 1 a flanged freewheel with a ring collar in a sectional view.

FIG. 1 shows a cross section through the flanged freewheel 1 arranged around the rotational axis z and having the outer ring 2 that is preferably made of sheet metal with a thickness x, for instance, 3.5 mm, and that is produced by means of deep-drawing. As an alternative, the outer ring 2 can be machined. The outer ring 2 is configured as an angled flange with the radially oriented flange area 3 so that—by means of the openings 4 distributed along the circumference—it can be attached to a component that is driven when the flanged freewheel 1 is blocked. The axially oriented ring flange 5 comprises the outer race 6 with the running surface 7 that forms the clamping ramps 8 which are distributed along the circumference and on which clamping rollers 9 are arranged that are accommodated in the clamping roller cage 10 and that are pre-tensioned against the clamping ramps 8 by means of the energy storage means 11. The figure does not show the inner ring comprising the cylindrical running surface for the clamping rollers 9 that is complementary to the running surface 7 of the outer race 6, nor does it show a shaft driven by a motor such as an electric motor, an internal combustion engine or the like.

The outer ring 2 comprises the radially inwards expanding ring collar 13 on the free end face 12 located opposite from the flange area 3, whereby said ring collar 13 radially supports the self-supporting end face 12 and also prevents tangential stress, so that surface cracks can be effectively prevented. Moreover, the ring collar 13 axially supports the clamping roller cage 10, so that there is no need for a retaining ring and the number of components can be reduced. The retaining means 14 is provided on the opposite side as an anti-loss device for axial securing purposes, at least during transportation.

Figures 2, 3:
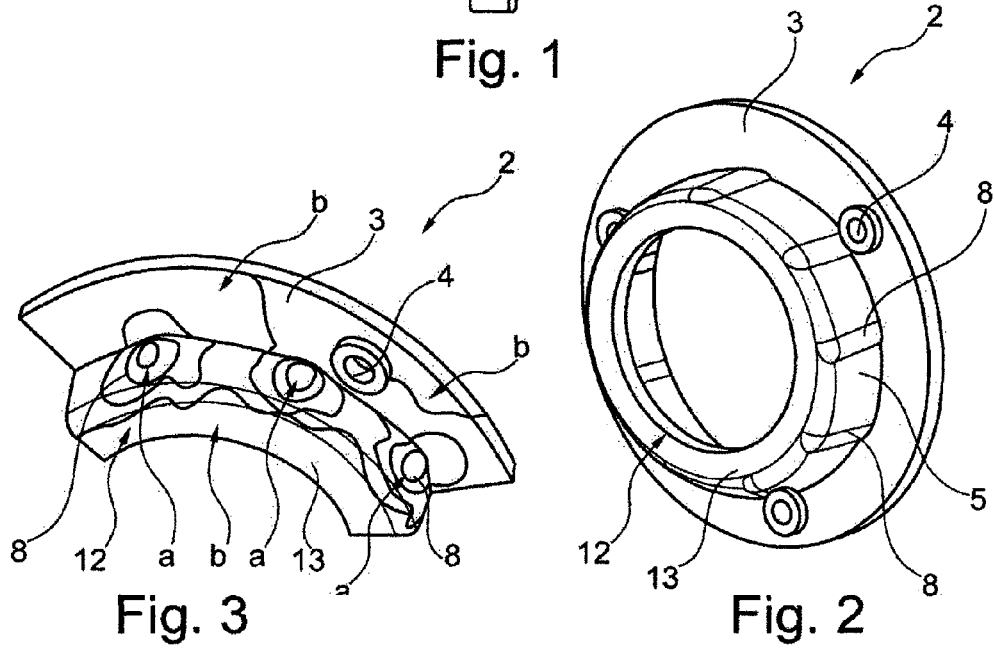
FIG. 2 a three-dimensional view of the outer ring of the flanged freewheel from FIG. 1.
FIG. 3 a section of the outer ring of the flanged freewheel from FIG. 2, with the load forces that occur during operation.

FIG. 2 shows a three-dimensional view of the outer ring 2 having the flange area 3 provided with the openings 4, having the axially installed ring flange 5 comprising the clamping ramps 8, and having the ring collar 13 formed onto the free end face 12.

FIG. 3 shows a section of the outer ring 2 from FIG. 2, depicting drawn force lines with areas a with a high force load and areas b with a low force load during operation. It can be clearly seen that, due to the installation of the ring collar 13, very low force loads occur during operation in the area of the end face 12 of the outer ring 2. For this reason, the ring collar 13 relieves the force on the outer ring 2 in the area of the free-supporting end face 12. The highest force loads occur on the outer ring 2 when the transmission torque is transferred from the shaft (not shown here) via the clamping rollers 9 (FIG. 1) to the clamping ramps 8 which transfer the transmission torque via the hardly stressed flange area 3 to the openings 4, and from there to the drive pinion of a starter device, for instance, via screws or rivets.

LIST OF REFERENCE NUMERALS 1. flanged freewheel
2. outer ring
3. flange area
4. opening
5. ring flange
6. outer race
7. running surface
8. clamping ramp
9. clamping roller
10. clamping roller cage
11. energy storage means
12. end face
13. ring collar
14. retaining ring
a area of high force load
b area of low force load
x sheet metal thickness
z axis of rotation

What is claimed is:

1. A flanged freewheel comprising:
an outer ring configured as an angled flange part and having an axially oriented ring flange forming a running surface for clamping elements and a radially oriented flange area for attaching the flanged freewheel, a ring collar extending radially inwards being provided at a free end face of the ring flange, the axially oriented ring flange having an outer circumferential surface opposite the running surface, the radially oriented flange area having a first radially extending surface and a second radially extending surface opposite the first radially extending surface, the outer circumferential surface contacting the first radially extending surface, and an insert that comprises the running surface and placed non-rotatable into the ring flange.

2. The flanged freewheel as recited in claim 1 wherein the clamping elements are provided on cylindrical running surfaces of the outer ring and of an inner ring as out-of-round clamping elements diameter expands as the clamping elements turn around axes of rotation.

3. The flanged freewheel as recited in claim 1 wherein the outer ring is a machined outer ring.

4. The flanged flywheel as recited in claim 1 wherein the outer circumferential surface and the first radially extending surface meet to form, cross-sectionally, a right angle.

5. The flanged flywheel as recited in claim 1 wherein the radially extending flange area as a second outer circumferential surface with a thickness less than the outer circumferential surface.

6. A method for manufacturing the flanged freewheel as recited in claim 1 comprising machining the outer ring.

7. The flanged freewheel as recited in claim 1 further comprising the clamping elements, the clamping elements being clamping rollers rolling off of clamping ramps of the outer ring or of an inner ring.

8. The flanged freewheel as recited in claim 7 wherein an outer race with a running surface having clamping ramps distributed along a circumference is provided on the outer ring.

9. The flanged freewheel as recited in claim 1 wherein a wall thickness of the radially oriented flange area between the first and second radially extending surfaces is less than 5 mm.

10. The flanged freewheel as recited in claim 9 wherein the wall thickness is about 3.5 mm.

11. A flanged freewheel comprising:
an outer ring configured as an angled flange part and having an axially oriented ring flange forming a running surface for clamping elements and a radially oriented flange area for attaching the flanged freewheel, a ring collar extending radially inwards being provided at a free end face of the ring flange, the axially oriented ring flange having an outer circumferential surface opposite the running surface, the radially oriented flange area having a first radially extending surface and a second radially extending surface opposite the first radially extending surface, the outer circumferential surface contacting the first radially extending surface,
wherein the outer ring is made in one single piece out of sheet metal,
wherein clamping ramps of an outer race are embossed into the ring flange of the outer ring.

12. The flanged freewheel as recited in claim 11 wherein the outer ring is a deep-drawn outer ring.

13. A method for manufacturing the flanged freewheel as recited in claim 11 comprising deep-drawing the outer ring.

* * * * *